Dec. 16, 1958 J. L. JENSEN 2,864,962

SEMICONDUCTOR APPARATUS

Filed April 26, 1957 3 Sheets-Sheet 1

INVENTOR.
JAMES L. JENSEN

BY Omund R. Dahle

ATTORNEY

Dec. 16, 1958 J. L. JENSEN 2,864,962

SEMICONDUCTOR APPARATUS

Filed April 26, 1957 3 Sheets-Sheet 2

INVENTOR.
JAMES L. JENSEN

BY Omund R. Dahle

ATTORNEY

Dec. 16, 1958 J. L. JENSEN 2,864,962

SEMICONDUCTOR APPARATUS

Filed April 26, 1957 3 Sheets-Sheet 3

INVENTOR.
JAMES L. JENSEN

BY Omund R. Dahle

ATTORNEY

United States Patent Office 2,864,962

Patented Dec. 16, 1958

2,864,962

SEMICONDUCTOR APPARATUS

James Lee Jensen, St. Louis Park, Minn., assignor to Minneapolis-Honeywell Regulator Company, Minneapolis, Minn., a corporation of Delaware Application April 26, 1957, Serial No. 655,301

9 Claims. (Cl. 307—88.5)

Figure 1:
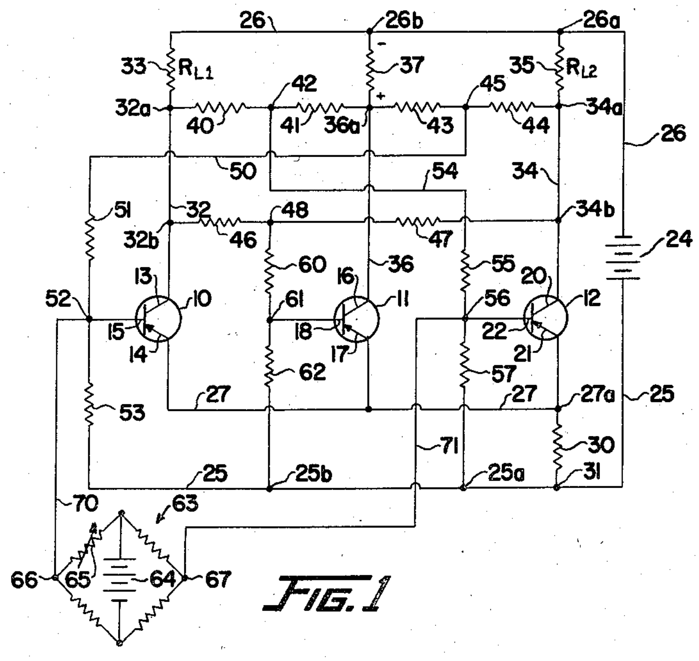

This invention relates to electronic multiposition switching circuits and relates more specifically to improved transistor multiposition switching circuits.

An object of this invention is to provide a multiposition transistor switching circuit for energizing one or another of a plurality of load devices in response to a signal or signals.

A further object of this invention is to provide a three position transistor switching circuit for energizing one or another of a plurality of load devices in response to an electrical signal.

Figure 2:
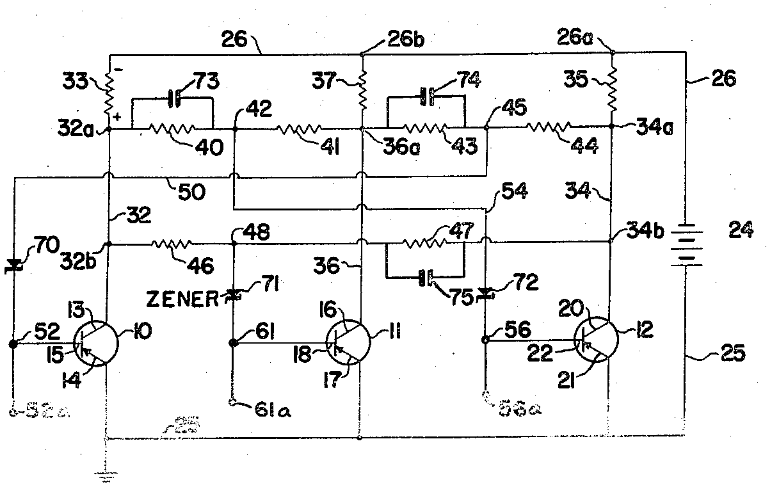
Figure 3:
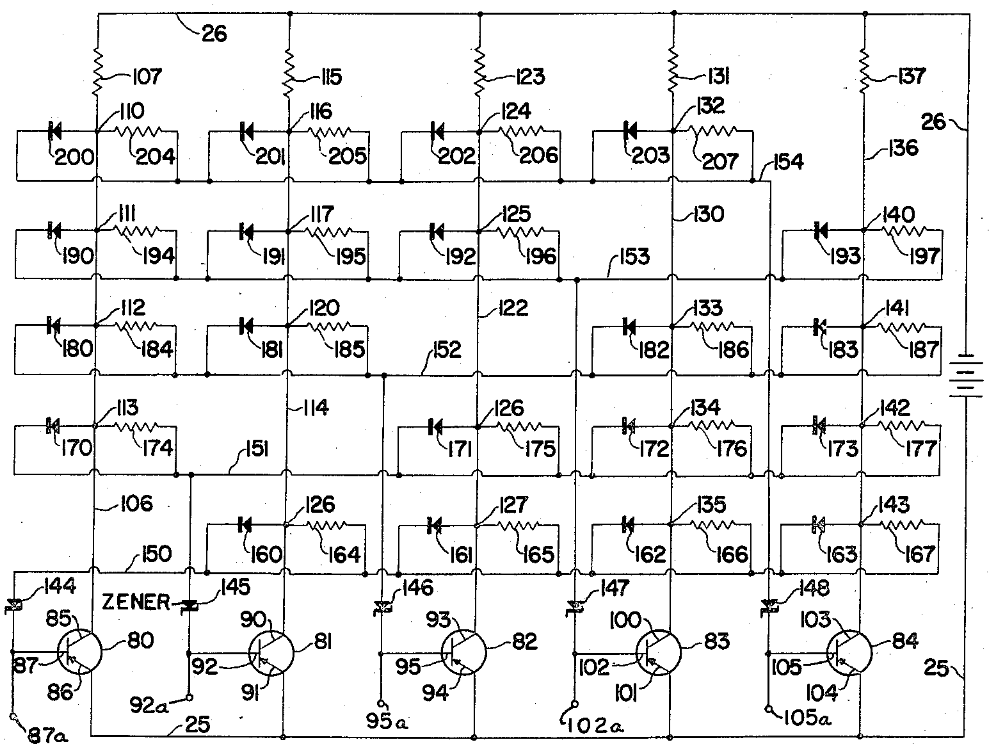
Figure 4:
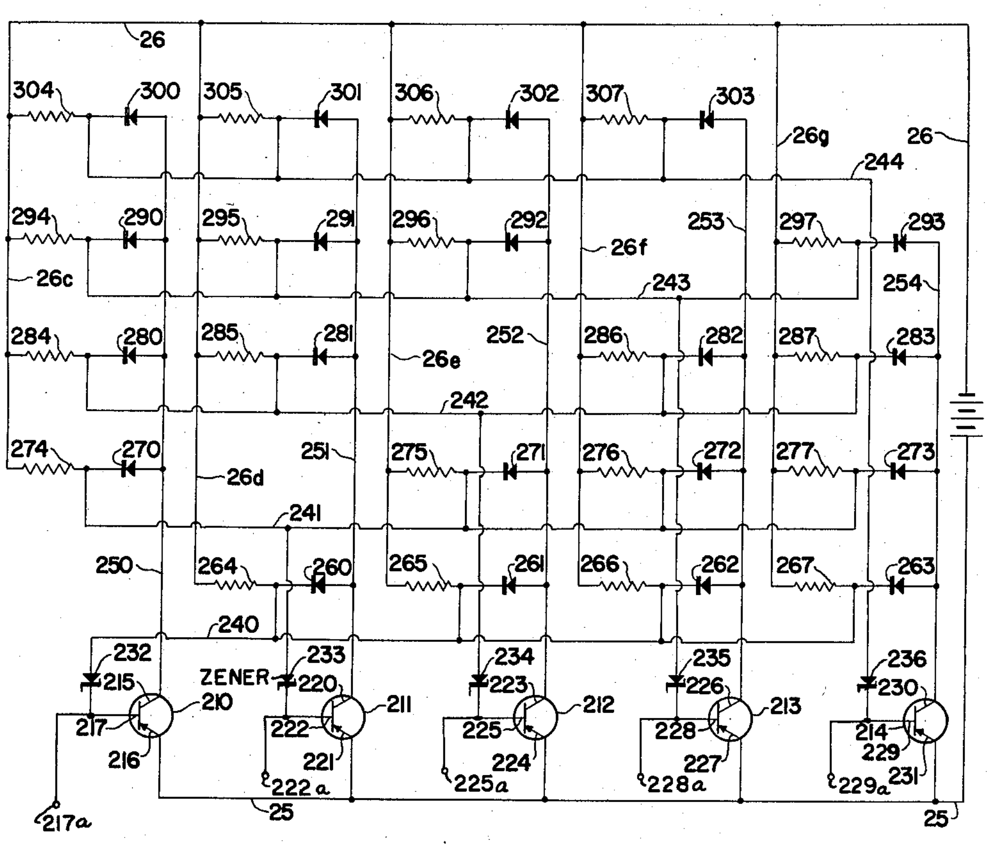

Various other objects, advantages, and features of novelty which characterize the invention are pointed out with particularity in the claims annexed hereto and forming a part hereof. However, for a better understanding of the invention, its advantages, and objects obtained by its use, reference should be had to the subjoined drawing, which forms a further part hereof, and to the accompanying descriptive matter, in which there is illustrated and described certain preferred embodiments of the invention. In the drawing:

Figure 1 is a schematic representation of the circuit of one embodiment of the invention and Figures 2, 3, and 4 are also schematic representations of other embodiments of the invention.

Referring now to Figure 1, there is disclosed a three position transistor switch which has three stable conditions of operation, the condition of operation at any given period being dependent upon an input signal. In a preferred construction of this circuit, one of the three operating positions is made a preferred condition to which the switch will return in the absence of an input signal, the switch being operable to either of two other positions by a suitable input signal. Three transistors, 10, 11, and 12 are disclosed in the figure, transistor 10 having a collector electrode 13, an emitter electrode 14, and a base electrode 15, transistor 11 having a collector electrode 16, an emitter electrode 17, and a base electrode 18. Likewise transistor 12 has a collector electrode 20, an emitter electrode 21, and a base electrode 22. The transistors are preferably junction transistors and have been disclosed as PNP junction transistors; however, any suitable transistor may be used by observing the proper polarity of supply potential.

A source of energizing potential 24, shown here as a battery for convenience of explanation, is utilized for energizing the circuit; the positive terminal of the battery is connected to a supply conductor 25, and the negative terminal to a supply conductor 26. The emitter electrodes 14, 17, and 21 of the three transistors are directly interconnected by a conductor 27, and are further connected to the supply conductor 25 by a common emitter resistor 30. This is accomplished by connecting one terminal of the resistor 30 to a junction 27*a* on conductor 27 and connecting the other terminal of the resistor to a junction 31 on conductor 25.

The collector electrode 13 is connected by a conductor 32 and a load device 33, here shown as a resistive element $R_{L1}$, to the negative supply conductor 26. The collector electrode 20 of transistor 12 is connected by a conductor 34 and a load device 35 to the negative supply conductor 26 at a junction 26*a*. The collector electrode 16 of transistor 11 is likewise connected by a conductor 36 and a resistance 37 to the conductor 26 at a junction 26*b*. A pair of series connected resistors 40 and 41 having an intermediate junction 42 are connected between a junction 32*a* on conductor 32 and a junction 36*a* on conductor 36. A pair of series connected resistors 43 and 44 having an intermediate junction 45 are connected between the junction 36*a* and a junction 34*a* on the conductor 34. A third pair of series connected resistors 46 and 47 having an intermediate connection 48 are connected between a junction 32*b* on conductor 32 and a junction 34*b* on conductor 34. The junction 45 is connected to the positive conductor 25 by a series circuit consisting of a conductor 50, a resistor 51, a junction 52, and a resistor 53. The junction 42 is connected to the positive conductor 25 by a conductor 54, a resistor 55, a junction 56, a resistor 57, and a junction 25*a* on conductor 25. The junction 48 is connected to the conductor 25 by a resistor 60, a junction 61, a resistor 62 and a junction 25*b* on conductor 25. These last named six resistors operating in conjunction with the other resistors, previously mentioned, control the bias potential to each of the transistors. The base electrode 15 of transistor 10 is connected to the junction 52; the base electrode 18 of transistor 11 is connected to the junction 61; and the base electrode 22 of the transistor 12 is connected to the junction 56.

A switching signal potential may be supplied from any suitable source; however, for ease of explanation a conventional condition responsive direct current bridge 63 is disclosed which bridge is energized by a battery 64, and which bridge includes a condition responsive impedance element 65. The element 65 may be, for example, a temperature responsive resistor such as Balco wire which has a positive temperature coefficient or a Thermistor which has a negative temperature coefficient. The bridge 63 has a pair of output electrodes 66 and 67 which are connected by a pair of conductors 70 and 71, respectively, to the junctions 52 and 56.

*Operation of Figure 1*

In considering the operation of the circuit of Figure 1, it should first be realized that the switching circuit can be designed to be tri-stable or it can be designed to have a preferred position to which it will return in the absence of a controlling signal. If the circuit is to be tri-stable, that is, if upon being switched into any one of the three possible switching positions, the circuit continues to function in that position until another switching signal is impressed on the circuit, then this may be accomplished by making the comparable resistors of the circuit having substantially identical values. The circuit may be designed to have a preferred position by changing the value of certain of the resistors making the circuit non-symmetrical whereby in the absence of a switching signal, the transistor switch tends to return to the preferred position.

Let it be assumed, for example, that it is desired to have transistor 11 in the on or conducting position when the control signal drops below a predetermined level or in the absence of a control signal. This may be accomplished, for example, by making the resistance of resistors 46 and 47, respectively, less than resistors 40 and 41 or resistors 43 and 44. It will be understood that when transistor 11 is in the on position the transistors 10 and 12 are in the off or non-conducting position, and that similarly when transistor 12 is switched to the on condition then transistors 10 and 11 are maintained in the off position.

Considering now the condition when transistor 11 is conducting and transistors 10 and 12 are non-conductive, a current path may be traced from the positive terminal of battery 24, through conductor 25, junction 31, emitter resistor 30 which is common to the emitter circuits of all three transistors, conductor 27, through transistor 11 from emitter electrode 17 to collector 16, conductor 36, resistor 37, and conductor 26 to the negative terminal of the battery 24. The transistor 11 being in a conductive state presents a relatively low impedance in the above described current path and the majority of the supply potential appears as a voltage drop across the resistor 37 and emitter resistor 30. The base bias potential for transistor 11 is determined by a circuit which includes the resistors 62, 60, 46, 47, 33, and 35. A current path may be traced from the positive supply conductor 25, junction **25*b*, resistor 62, resistor 60, junction 48 where the current path divides, the first portion flowing through resistor 46, conductor 32 and load resistor 33 to the negative conductor 26, and the second portion flowing through the resistor 47, junction 34*b*, conductor 34, and load resistor 35 to the negative conductor 26**.

A similar bias current path may be traced for transistor 10, the path may be traced from the positive supply terminal 25 through resistor 53, junction 52, resistor 51, conductor 50, junction 45 where the current path divides, a first portion flowing through resistor 43, junction **36*a*, and resistor 37 to the negative conductor 26, and the second portion flowing through resistor 44, junction 34*a* and load resistor 35 to the conductor 26. A similar path may be traced for transistor 12 through the resistor 57, junction 56, resistor 55, junction 42 where the path divides, a first portion flowing through resistor 40, junction 32*a*, and the load resistor 33 to the negative supply terminal 26, and the second portion flowing through the resistor 41, junction 36*a*, and the load resistor 37 to the negative supply conductor 26**. It will be understood that the currents flowing in the three base bias circuits are relatively small compared to the current flowing in the output circuit of a transistor switch in its on position.

In the condition when transistor 11 is on, the majority of the supply voltage potential appears across the resistor 37 since the transistor 11 represents a very low impedance and has a relatively small voltage between collector and emitter electrodes, and the resistor 30 is chosen to provide a relatively low potential, the magnitude of which potential needs merely be large enough to provide a back bias to the emitter-base electrodes of transistors 10 and 12. Since the potential appearing across resistor 37 is substantial, the potential at junction **36*a* is effective through the biasing resistors 41 and 43, respectively, to maintain the transistors 10 and 12 cut off. The potentials appearing across the load resistors 33 and 35 are substantially nil with transistors 10 and 12 cut off; therefore, the potentials on junction 32*b* and 34*b* approach the potential of the negative conductor 26. These relatively negative potentials at junctions 32*b* and 34*b*, respectively, are effective through the bias resistors 46 and 47 to maintain the transistor 11** in a state of conduction.

Up until now the operation of the circuit of Figure 1 has been considered during the period when the signal bridge 63 is in a state of balance or near balance so that there is substantially no output potential appearing across the signal bridge terminals 66 and 67. Now let us assume that the condition being sensed by condition responsive resistor 65 changes, so that the bridge becomes unbalanced and a potential appears between terminals 66 and 67. This condition being sensed may be, for example, the temperature in an area in which the temperature must be maintained within a predetermined temperature range. The switching circuit of Figure 1 could then control a heating-cooling system for the area to be controlled of which the loads $R_{L1}$ and $R_{L2}$, numbered 33 and 35, are representative of the system. The sensing element 65 might also be a humidity sensitive element or a strain gauge element or any other suitable condition responsive device.

Let us assume the bridge unbalance is in a direction to make the terminal 66 negative with respect to terminal 67. Since terminal 66 is connected to the base electrode 15 of transistor 10, the negative going signal potential will tend to initiate current flow in transistor 10. Terminal 67 of the bridge is connected to base electrode 22 of transistor 12; however, the positive going signal potential at bridge terminal 67 will tend to keep transistor 12 cut off.

As the signal potential from the bridge 63 increases sufficiently to cause a base current to flow in transistor 10, an output current will also flow from collector electrode 13 and through the load 33. As current flows in the load device 33 the potential at junction **32*b* is changed in a positive going direction so that the base bias to transistor 11 through resistors 46, 47, 60 and 62 is no longer sufficiently negative to maintain transistor 11 conductive. A regenerative feedback switching action occurs, since as the conduction of transistor 11 is reduced the potential at junction 36*a* moves in a negative going direction whereby the bias potential at base 15 is increased in a negative going direction through the resistors 43, 51 and 53 to tend to maintain transistor 10 in a conductive state. The potential which previously existed at junction 36*a* which was effective through resistors 41, 55 and 57 to maintain transistor 12 cut off is no longer present with transistor 10 conducting; however, a similar potential from junction 32*a* through resistors 40, 55, and 57 now tends to maintain transistor 12** cut off.

If the switching circuit is designed symmetrically the circuit will be tri-stable so that when the circuit switches to cause transistor 10 to commence conducting and transistors 11 and 12 to be non-conducting, the circuit will remain in this position until a signal is received which is sufficiently large to switch the circuit so that transistor 11 or 12 would become conductive. In the preferred construction of the circuit of Figure 1, however, the bias circuit of transistor 11 is not symmetrical with those of the other transistors so that as the condition sensed by bridge 63 returns towards its desired value and the output potential of the bridge diminishes to a predetermined drop out threshold value, the transistor 11 will recommence conducting and cut off transistor 10 and thus cut off the power to load device $R_{L1}$.

Let us now assume that the condition being sensed reverses from that previously considered so that an output potential appears from bridge 63, the polarity of which makes terminal 67 negative with respect to terminal 66. In a manner similar to that previously explained, this potential upon reaching sufficient magnitude is effective to cause transistor 12 to become conductive thereby energizing load device $R_{L2}$, shown as resistor 35, whereupon the transistors 10 and 11 will be maintained cut off.

*Figure 2*

The circuit of Figure 2 is in many respects similar to that disclosed in Figure 1, and like components have been given the same identifying numerals in Figure 2 as have been disclosed and described for Figure 1. The components of Figure 2 which carry the same numbers as in Figure 1 perform substantially the same function as previously described for Figure 1 and will not be repeated. Only the elements which are new or which perform a different function will be discussed hereafter. The emitter electrodes 14, 17, and 21, respectively, of the transistors 13, 16 and 20 are each directly connected to the positive supply conductor 25. The biasing resistors 51, 60 and 55 have been replaced in Figure 2 by Zener diodes 70, 71 and 72. The resistors 53, 62 and 57 which were shown in Figure 1 connected between the respective base electrodes and the conductor 25 have been eliminated from the circuit of Figure 2, however, under certain operating conditions it may be desirable to retain these resistors in Figure 2. If it is desired to provide a predetermined sequence of switching from one transistor to the next, this may be accomplished by connecting capacitors across certain of the biasing resistors such as, for example, connecting capacitors 73, 74 and 75 across the resistors 40, 43 and 47, respectively. Signal input terminals 52*a*, 61*a* and 56*a* are adapted to be connected to a suitable source of input signal or signals.

A Zener diode is a semi-conductor junction rectifier poled so that current flows through it in the reverse or high resistance direction. The Zener voltage or Zener point is the voltage across the rectifying junction associated with that portion of the reverse voltage vs. current characteristic of a semiconductor junction device wherein the voltage across the junction remains substantially constant over a considerable range of current values.

In considering the operation of the circuit of Figure 2, let it be assumed that initially transistor 10 is conductive. A current path may be traced from the positive terminal of battery 24 through conductor 25, emitter to collector of transistor 10, load resistor 33, and conductor 26 to the negative terminal of the battery. With transistor 10 conductive, the output impedance of the transistor is relatively low compared to the resistance of load device 33, so that the collector electrode 13 and the conductor 32 are only slightly negative with respect to conductor 25. The potential at the junction 42 between resistors 40 and 41 is not sufficiently negative to exceed the Zener voltage of Zener diode 72 and therefore transistor 12 will not conduct but will be cut off. The potential at the junction 48 of resistors 46 and 47 is also not sufficiently negative to exceed the Zener voltage of the Zener diode 71 so that transistor 11 will be non-conductive.

Since substantially no current flows in the collector circuits of transistors 11 and 12 there will be very little voltage developed across the resistors 37 and 35 and the conductors 36 and 34 will be substantially at the potential of the negative supply conductor 26. As a result of the transistors 11 and 12 being non-conductive a junction 45 of the resistors 43 and 44 will be quite negative, in fact sufficiently negative to exceed the Zener voltage of the diode 70 and allow Zener diode 70 to conduct current. The transistor switching circuit is stable in this condition and will continue to operate in this position until another switching pulse is applied to the circuit.

If a signal of sufficient strength is injected into the input circuit of transistor 11, transistor 11 will become conductive and the resultant change in potential on conductor 36 will cause the junction 45 between resistors 43 and 44 to be reduced below the Zener point of diode 70 thereby causing transistor 10 to become nonconductive. Both transistors 10 and 12 being nonconductive the potentials on conductors 32 and 34 are sufficiently negative to maintain the junction 48 between resistors 46 and 47 sufficiently negative to exceed the Zener point of diode 71, to maintain the switch stable in this position. Similarly, if a signal potential of sufficient magnitude is injected into the input circuit of transistor 12, it can be made conductive to energize the load device 35 and to maintain the transistors 10 and 11 cut off. It can be seen therefore that the transistor switch of Figure 2 is capable of controlling the energization to three separate load devices.

It may desirable to provide in the circuit of Figure 2, a method of controlling the sequencing of the switching. Let it be assumed, for example, it is desired to have the switch sequence from transistor 10, then to transistor 12, then transistor 11 and back to transistor 10. This may be accomplished, as shown in Figure 2, by connecting capacitors 73, 74, and 75, respectively, in parallel with the resistors 40, 43, and 47. During the period when the transistor switch is in the position in which transistor 10 is conductive, capacitor 73 charges to a substantial potential across its terminals. If transistor 10 is now made non-conductive the potential at the collector 13 and on the conductor 32 approaches the potential of conductor 26. The charge on capacitors 73, being additive to the changing potential on conductor 32 is effective to immediately exceed the Zener potential of diode 72 whereby transistor 12 is caused to commence conducting. The conduction of transistor 12 is effective to maintain the transistors 10 and 11 in a state of non-conduction. At such time as transistor 12 is caused to become non-conducting, the potential charge on conductor 34 and the potential charge on the capacitor 75 will be effective to exceed the Zener point of diode 71 and transistor 11 will become conductive. In a like manner, by means of the charge now developed on capacitor 74, the transistor 10 will be caused to recommence conducting when the transistor 11 is caused to cease conducting. This sequencing circuit has many applications, such as, for the use in a frequency divider or a three-phase generator.

*Figure 3*

The circuit of Figure 3 discloses a multiposition switch, and which as shown is a five position switch. The circuit as shown includes five transistors 80, 81, 82, 83, and 84; transistor 80 having a collector electrode 85, an emitter electrode 86, and a base electrode 87; transistor 81 having a collector electrode 90, an emitter electrode 91, and a base electrode 92; transistor 82 having a collector electrode 93, an emitter electrode 94, and a base electrode 95; transistor 83 having a collector electrode 100, an emitter electrode 101, and a base electrode 102; and transistor 84 having a collector electrode 103, an emitter electrode 104, and a base electrode 105. The emitter electrodes 86, 91, 94, 101, and 104 are all directly connected to the positive supply conductor 25. The collector electrode 85 is connected by a conductor 106 and a load resistor 107 to the negative supply conductor 26. The conductor 106 has several junctions or nodes numbered 110, 111, 112, and 113. The collector electrode 90 is connected by a conductor 114 and a load resistor 115 to the negative supply conductor 26. The conductor 114 has several junctions numbered 116, 117, 120, and 121. The collector electrode 93 is connected by a conductor 122 and a load resistor 123 to the supply conductor 26. The conductor 122 has several junctions located on it numbered 124, 125, 126, and 127. The collector electrode 100 is connected to the conductor 26 by a conductor 130 and a load resistor 131. The conductor 30 has several junctions located on it numbered 132, 133, 134, and 135. The collector electrode 103 is connected by a conductor 136 and a load resistor 137 to the negative supply conductor 26. The conductor 136 has junctions located on it numbered 140, 141, 142, and 143.

The base electrodes 87, 92, 95, 102 and 105, respectively, are directly connected to Zener diodes 144, 145, 146, 147, and 148. The opposite terminals of the diodes 144, 145, 146, 147, and 148 are connected, respectively, to conductors 150, 151, 152, 153, and 154. The conductor 150 is connected to conductors 114, 122, 130, and 136, respectively, by junction diodes 160, 161, 162, and 163. The four last named diodes are paralleled, respectively, by resistors 164, 165, 166 and 167. The conductor 151 is connected to conductors 106, 122, 130 and 136, respectively, by junction diodes 170, 171, 172 and 173. The last named diodes are paralleled, respectively, by resistors 174, 175, 176 and 177. Similarly, the conductor 152 is connected to the conductors 106, 114, 130, and 136, respectively, by junction diodes 180, 181, 182 and 183. The last named diodes are paralleled respectively, by resistors 184, 185, 186, and 187. The conductor 153 is connected to the conductors 106, 114, 122, and 136, respectively by junction diodes 190, 191, 192, and 193. The last named diodes are paralleled respectively by resistors 194, 195, 196 and 197. The conductor 154 is connected to the conductors 106, 114, 122 and 130 at junctions 110, 116, 124 and 132, respectively, by junction diodes 200, 201, 202, and 203. The last named diodes are paralleled, respectively by resistors 204, 205, 206 and 207.

*Operation of Figure 3*

In considering the operation of the multiposition switch in Figure 3 it is important to bring to mind the fact that in this circuit as well as in Figures 1 and 2, only one transistor can be conductive at any one time. Let it be assumed that transistor 80 is conducting. A current path may be traced to the transistor switch from the battery through the conductor 25, from the emitter to collector of transistor 80, the conductor 106, the load resistor 107, and the conductor 26 to the negative terminal of the battery. Under these operating conditions, the transistor represents a very low impedance and the potential at the collector electrode 85 and the conductor 106 approaches the potential on conductor 25.

Current paths may also be traced from the conductor 106 through the diodes 170, 180, 190, and 200, for example, current flows from the conductor 106 through the diode 170 in the forward direction or in the direction of easy current flow and through the resistors 175, 176 and 177, respectively, to the conductors 122, 130, and 136 and thence through the resistors 123, 131, and 137, to the conductor 26. The relatively low forward voltage drop across the diode 170 is effective to connect the potential existing on conductor 106 to the Zener diode 145, and since the voltage drop across the transistor 80 was relatively low the potential existing across the Zener diode 145 is substantially below the Zener point of the diode so that no current flows through the diode 145 and thus no base current flows in transistor 90 thereby maintaining transistor 90 cut off.

In addition to the junction diode 170 being connected to the conductor 106, there are also three other diodes 180, 190 and 200 which are affected by similar circuit means, respectively, to maintain and cut off the transistors 82, 83 and 84. Since the transistors 81, 82, 83 and 84 are maintained cut off, the potentials on the conductors 114, 122, 130 and 136, respectively, approach the potential of conductor 26. Consider now the parallel combination of the series connected resistors 115 and 164, 123 and 165, 131 and 166, and 137 and 167. The parallel combination of these resistors provides a sufficiently low resistance path between the Zener diode 144 and the negative supply terminal 26 to exceed the Zener point of the diode 144 and maintain conduction therethrough and thereby maintain transistor 80 in a state of conduction. Therefore, only one transistor is on at a time. When transistor 80 goes off, one other transistor will come on, or if another transistor becomes conductive, transistor 80 will be cut off. Preferential sequencing may be obtained if desired by the use of capacitors. The signal input terminals 87*a*, 92*a*, 95*a*, 102*a* and 105*a* may be connected to any suitable signal source or sources.

Let us now assume that transistor 82 is made conductive. As this transistor becomes conductive the potential on the collector electrode 93 and the conductor 122 approaches the potential of the positive supply conductor 25. The junction diode 161 connects the conductor 122 with the Zener diode 144 in the base circuit of transistor 80 producing the potential existing across the Zener diode 144 below the Zener point and the transistor 80 becomes nonconductive along with the other nonconductive transistors 81, 83 and 84.

*Figure 4*

The circuit of Figure 4 is of a multiposition transistor switch and is a modification of the circuit of Figure 3. In the figure there are shown a plurality of switching transistors 210, 211, 212, 213 and 214. The transistor 210 has a collector electrode 215, an emitter electrode 216, and a base electrode 217; the transistor 211 has a collector electrode 220, an emitter electrode 221, and a base electrode 222; the transistor 212 has a collector electrode 223, an emitter electrode 224, and a base electrode 225; the transistor 213 has a collector electrode 226, an emitter electrode 227, and a base electrode 228; and the transistor 214 has a collector electrode 230, an emitter electrode 231, and a base electrode 232.

The emitter electrodes 216, 221, 224, 227, and 231 are each directly connected to the positive supply conductor 25. A plurality of Zener diodes 232, 233, 234, 236 and 236 are connected, respectively, to the base electrodes 217, 222, 225, 228 and 232 of the transistors. The base electrode 217 is connected by the Zener diode 232 to a conductor 240; the base electrode 222, by the Zener diode 233 to a conductor 241; the base electrode 225, by the Zener diode 234 to a conductor 242; the base electrode 228, by the Zener diode 235 to a conductor 243; and the base electrode 232 by the Zener diode 236 to a conductor 244. The base electrodes are also connected to the signal input terminals 217*a*, 222*a*, 225*a*, 228*a* and 229*a*, respectively. These signal input terminals may be connected to any suitable source or sources of signal potential.

The collector electrodes 215, 220, 223, 226 and 230 are connected, respectively, to conductors 250, 251, 252, 253 and 254. The conductor 240 is connected by a plurality of junction diodes 269, 261, 262 and 263, respectively, to the conductors 251, 252, 253 and 254. The conductor 240 is also connected by a plurality of resistors 264, 265, 266, and 267, respectively, to conductors 26*d*, 26*e*, 26*f* and 26*g*, which conductors are extensions of the negative supply conductor 26. The conductor 241 is connected by a plurality of junction diodes 270, 271, 272, and 273, respectively, to conductors 250, 252, 253 and 254. The conductor 241 is also connected by a plurality of resistors 274, 275, 276 and 277, respectively, to the conductors 26*c*, 26*e*, 26*f* and 26*g*. The conductor 242 is connected by junction diodes 280, 281, 282 and 283, respectively, to the conductors 250, 251, 253 and 254. The conductor 42 is also connected by resistors 284, 285, 286, and 287 respectively, to the conductors 26*c*, 26*d*, 26*f* and 26*g*. The conductor 243 is connected by junction diodes 290, 291, 292 and 293, respectively, to the conductors 250, 251, 252, and 254. The conductor 243 is also connected by resistors 294, 295, 296 and 297, respectively, to the conductors 26*c*, 26*d*, 26*e* and 26*g*. Similarly, the conductor 244 is connected by junction diodes 300, 301, 302, and 303, respectively, to the conductors 250, 251, 252 and 253. The conductor 244 is also connected by the resistors 304, 305, 306 and 307, respectively, to the conductors 26*c*, 26*d*, 26*e* and 26*f*.

Although not shown in Figure 4, if desired, a load device may be connected in the emitter circuit of each of the transistors. For example, the emitter base circuit of a transistor could be connected in the emitter circuit of each of the transistors 210 to 214.

*Operation of Figure 4*

In considering the operation of the circuit of Figure 4 it will be remembered that one but only one transistor is on at any given moment. If another of the transistor switches is caused to commence conducting the previously conductive transistor switch will be cut off. Let it be assumed that the transistor 210 is on or conductive. A current path may be traced from the positive supply conductor 25 through the low impedance of conductive transistor 210 from emitter to collector, to conductor 250 where the current splits into four portions, going through junction diodes 270, 280, 290, and 300. The current flowing through the diode 270 is further divided with portions flowing through each of the resistors 274, 275, 276 and 277 to the negative conductor 26. Similarly, the current flowing through the diode 280 is further divided and a portion flows through each of the resistors 284, 285, 286, and 287 to the negative supply conductor 26. Similar current paths can be traced by the current flowing through the diodes 290 and 300. Since the transistor 210 is conductive the potential at the collector electrode 215 and the conductor 250 approaches the potential of the positive supply conductor 25. The relatively small forward potential dropped across the junction diodes 270, 280, 290 and 300, respectively, insures that the potentials existing across the Zener diodes 233, 234, 235 and 236 will be considerably less than the Zener point at which these diodes will commence conduction. The non-conduction of the Zener diodes allows substantially no base current to flow in the transistors 211, 212, 213 and 214 thereby maintaining these transistors cut off. When the transistors 211, 212, 213 and 214 are cut off, a high impedance exists between the emitter and collector electrodes of these transistors and as a result a relatively high potential exists across the transistors. The potentials on the conductors 251, 252, 253 and 254, therefore, approaches the potential of the negative supply conductor 26. A base current path for the conducting transistor may be traced from the base electrode 217 of transistor 210 through the Zener diode 232 to the conductor 240 and through the paralleled resistors 264, 265, 266 and 267 to the negative conductor 26. The paralleled combinations of these resistors presents a low impedance to maintain a sufficient potential across the Zener diode to exceed its Zener point and thereby maintain current flow in the input circuit of the transistor 210 to sustain conduction of the stage. The conductors 251, 252, 253 and 254 are at a relatively negative potential and therefore substantially no current flows through the diodes 260, 261, 262 and 263.

Let it be assumed that an input signal is impressed on the input circuit of transistor 213 making this transistor conductive. In following the switching action of the circuit a current path may now be traced from the positive conductor 25 through the low impedance of the emitter to collector circuit of transistor 213, to the conductor 253, the current then dividing four ways and flowing through the diodes 262, 272, 282 and 303. The relatively low potential existing across the transistor 213 and the junction diode 252 is effective to reduce the potential across the Zener diode 232 in the input circuit of transistor 210 to a value below its Zener conducting point whereupon a transistor 210 becomes non-conductive together with the other non-conducting transistors 211, 212, and 214. The previously described current flowing through the junction diode 262 is further divided and flows through the paralleled resistors 264, 265, 266 and 267 to the negative supply conductor 26. Similarly, the current flow through the junction diode 272 is further subdivided and flows through the paralleled resistors 274, 275, 276, and 277 to the negative conductor 26. Similar paths may be traced for the currents flowing through the junction diodes 282 and 303. If transistor 213 is caused to become nonconducting for any reason one of the other transistor switches will switch on. Sequential operation may be arranged, for example, by placing suitable capacitors across the junction diodes 260, 271, 282, 293 and 300.

Many changes and modifications in this invention will undoubtedly occur to those who are skilled in the art and I therefore wish it to be understood that I intend to be limited by the scope of the appended claims and not by the specific embodiments of my invention which are disclosed herein for the purpose of illustration.

I claim:

1. Multiposition semiconductor switching apparatus comprising: at least three semiconductor switching means, each of said semiconductor means having a plurality of electrodes including an output electrode, a control electrode and a further electrode; a source of direct current potential having a first and a second terminal; means connecting the further electrode of each of the semiconductor switching means to the first terminal of said source; load means for each of the semiconductor switching means connected, respectively, between the output electrode of each semiconductor switching means and the second terminal of said source; a plurality of Zener diodes; feedback impedance means including said Zener diodes connected from the output electrode of each of said semiconductor switching means to the control electrode of each of the other semiconductor switching means; and means for connecting a source of switching signals in controlling relation to said semiconductor switching means.

2. Multiposition semiconductor switching apparatus comprising: first, second, and third semiconductor switching devices, each of said devices having a plurality of electrodes including an output electrode, a control electrode, and a common electrode; a source of direct current potential having a first and a second terminal; means connecting the common electrode of each of said devices to the first terminal of said source; first, second and third load means connected, respectively, between the output electrode of each semiconductor device and the second terminal of said source; first impedance means having a first intermediate tap, said first means being connected intermediate the output electrodes of said second and said third devices; second impedance means having a second intermediate tap, said second means being connected intermediate the output electrodes of said first and said third devices; third impedance means having a third intermediate tap, said third means being connected intermediate the output electrodes of said first and said second semiconductor devices; first Zener diode means connecting the first intermediate top to the control electrode of said first semiconductor device; second Zener diode means connecting the second intermediate tap to the control electrode of said second semiconductor device; third Zener diode means connecting the third intermediate tap to the control electrode of said third semiconductor device; and means for connecting switching signal producing means in controlling relation to said devices.

3. Multiposition transistor switching apparatus comprising: first, second, and third transistors, each of said transistors having a plurality of electrodes including a collector, an emitter, and a control electrode; a source of direct current potential having a first and a second terminal; means connecting the emitter electrode of each of said transistors to the first terminal of said source; first, second, and third load means connected, respectively, between the collector electrode of said first, second and third transistors and a second terminal of said source; first impedance means having a first intermediate tap, said first impedance means being connected intermediate the collector electrodes of said second and third transistors; second impedance means having a second intermediate tap, said second means being connected intermediate the collector electrodes of said first and third transistors; third impedance means having a third intermediate tap, said third means being connected intermediate the collector electrodes of said first and second transistors; first Zener diode means connecting the first transistor control electrodes to said first intermediate tap; second Zener diode means connecting the second transistor control electrode to said second intermediate tap; and third Zener diode means connecting the third transistor control electrode to said third intermediate tap.

4. Multiposition semiconductor switching apparatus comprising: at least three transistors, each of said transistors having a plurality of electrodes including a collector electrode, an emitter electrode, and a control electrode; means connecting the emitter electrode of each of said transistors to a reference terminal; impedance means for each of said transistors, said impedance means connecting the collector electrode of each transistor to a direct current potential terminal; a plurality of Zener diodes each having a pair of terminals; means connecting a first terminal of a Zener diode to the control electrode of each of the transistors; and further impedance means connecting the Zener diode second terminal, associated with each transistor to the collector electrode of each of the other transistors.

5. Multiposition semiconductor switching apparatus comprising: at least three semiconductor switching means, each of said semiconductor means having a plurality of electrodes including an output electrode, a control electrode, and a further electrode; means connecting the further electrode of each of the semiconductor means to a reference terminal; impedance means separately connecting the output electrode of each of said semiconductor means to a direct current potential source; and asymmetric current conducting means connecting the control electrode of each semiconductor means to the output electrode of each of the other semiconductor means.

6. Multiposition semiconductor switching apparatus comprising: at least three semiconductor switching means, each of said semiconductor means having a plurality of electrodes including an output electrode, a control electrode and a further electrode; means connecting the further electrode of each of the semiconductor means to a reference terminal; impedance means separately connecting the output electrodes of each of the semiconductor means to a direct current potential source; a plurality of Zener diodes, each of said diodes having a first and second terminal, a separate one of said Zener diodes being connected by the first terminal, respectively, to the control electrodes of each of said semiconductor means; and asymmetric current conducting means connecting the second terminal of each of said Zener diodes to the output electrodes of each of the other semiconductor means which are not connected to the first terminal of the respective Zener diode.

7. Multi-position semiconductor switching apparatus comprising: at least three semiconductor switching means, each of said semiconductor means having a plurality of electrodes including an output electrode, a control electrode and a further electrode; means connecting the further electrode of each of said means to a reference potential terminal; load means for each of the semiconductor switching means connected, respectively, between the output electrode of each semiconductor switching means and a direct current potential terminal; a plurality of Zener diodes; feedback impedance means including said Zener diodes connected from the output electrode of each of said semiconductor switching means to the control electrode of each of the other semiconductor switching means; reactive coupling means connected from the output electrode of each of said semiconductor switching means, respectively, to the control electrode of one of the other semiconductor switching means for providing a predetermined switching sequence of said switching apparatus; and means for connecting a source of switching signals in controlling relation to the semiconductor switching means.

8. Mutli-position semiconductor switching apparatus comprising: first, second, and third semiconductor switching devices, each of said devices having a plurality of electrodes including an output electrode, a control electrode, and a common electrode; means connecting the common electrode of each of said devices to a reference potential terminal; first, second, and third load means connected, respectively, between the output electrode of each of said semiconductor devices and a direct current potential terminal; first impedance means having a first intermediate tap, said first means being connected intermediate the output electrodes of said second and third devices; second impedance means having a second intermediate tap, said second means being connected intermediate the output electrodes of said first and third devices, third impedance means having a third intermediate tap, said third means being connected intermediate the output electrodes of said first and second semiconductor devices; first Zener diode means connecting the first intermediate tap to the control electrode of said first semiconductor device; second Zener diode means connecting the second intermediate tap to the control electrode of said second semiconductor device; third Zener diode means connecting the third intermediate tap to the control electrode of said third semiconductor device, first capacitive means connected intermediate said first intermediate tap and the output electrode of said second semiconductor device; second capacitive means connected between said second intermediate tap and the output electrode of said third semiconductor device; third capacitive means connected between said third intermediate tap and the output electrode of said first semiconductor device for providing a predetermined sequence of switching of said switching apparatus; and means for connecting switching signal producing means in controlling relation to said device.

9. Multi-position semiconductor switching apparatus comprising: at least three transistors, each of said transistors having a plurality of electrodes including a collector electrode, an emitter electrode, and a control electrode, means connecting the emitter electrode of each of said transistors to a reference potential terminal; impedance means for each of said transistors, said impedance means connecting the collector electrode of each transistor to a direct current potential terminal; a plurality of Zener diodes each having a pair of terminals; means connecting a first terminal of the Zener diodes, respectively, to the control electrode of each of the transistors; further impedance means connecting the Zener diode second terminal to the collector electrode of each of the other transistors; and capacitive means connected between the collector electrode of each of said transistors and the control electrode of one other of said transistors to provide a predetermined sequence of switching.

References Cited in the file of this patent

UNITED STATES PATENTS

| | | |
|---|---|---|
| 2,573,813 | Shumard | Nov. 6, 1951 |
| 2,594,092 | Taylor | Apr. 22, 1952 |
| 2,782,373 | Shumard | Feb. 19, 1957 |